United States Patent Office 3,439,018
Patented Apr. 15, 1969

3,439,018
ALPHA-(4-CHLORO-2-METHYLPHENOXY) PROPIONANILIDES
Robert Frederick Brookes, David Henry Godson, and Edward Levi Leafe, Nottingham, England, assignors to Boots Pure Drug Company Limited, Nottingham, England, a British company
No Drawing. Filed Sept. 16, 1964, Ser. No. 397,032
Claims priority, application Great Britain, Sept. 30, 1963, 38,458/63
Int. Cl. C07c *103/74, 127/16;* A01n *9/20*
U.S. Cl. 260—471                                                              4 Claims

ABSTRACT OF THE DISCLOSURE

Herbicidal compounds of the formula

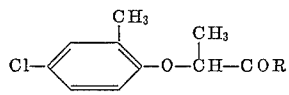

in which R may be, inter alia, optionally substituted amino, hydrazino, oxyamino, ureido, sulfonamido, carbamato, and the like.

---

This invention relates to new chemical compounds, herbicidal compositions containing said new compounds as active ingredients, and methods of controlling weeds by means of the compounds.

According to one feature of the present invention there are provided compounds of the general Formula I

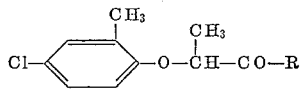

wherein R is selected from (a) —$NHR_1$, (b)

—$N(R_3)$—$NR_4R_5$ (c) —$N(R_3)$—$N=R_6$ and (d) —$N(R_7)OR_8$; in which $R_1$, $R_3$, $R_4$, $R_5$, $R_7$ and $R_8$ each represents an optionally substituted aliphatic radical, an optionally substituted aromatic radical, the acyl residue of an organic carboxylic or sulphonic acid, an esterified carboxyl or thiocarboxyl radical, carbamoyl, substituted carbamoyl, thiocarbamoyl, substituted thiocarbamoyl, sulphamoyl, substituted sulphamoyl or, with the exception of $R_1$, a hydrogen atom; $R_6$ represents an optionally substituted alkylidene radical; $R_4$ and $R_5$ together with the nitrogen atom to which they are attached may form a heterocyclic ring; $R_3$ and $R_4$ or $R_6$ together with the nitrogen atoms to which they are attached may form a heterocyclic ring; and $R_7$ and the nitrogen atom to which it is attached together with $R_8$ and the oxygen atom to which it is attached may form a heterocyclic ring.

Typical examples of compounds of the invention include those containing one or more of the radicals listed below:

$R_1$, $R_3$, $R_4$, $R_5$, $R_7$, $R_8$:

(a) Optionally substituted aliphatic radicals: These include alkyl (e.g., methyl, ethyl, propyl, butyl), cycloalkyl (e.g., cyclohexyl), alkenyl (e.g., allyl), and alkynyl (e.g., propynyl) groups, unsubstituted or containing one or more substituents such as halogen atoms, or aryl, hydroxy, alkoxy, amino, substituted amino, carboxyl, esterified carboxyl, sulphonyl, cyano and acyl radicals. Any phenyl substituent may be optionally substituted in the ring.

(b) Optionally substituted aromatic radicals: These include the phenyl radical and phenyl radicals containing substituents for example mono-halo and nitro, monoalkyl, trifluoromethyl, cyano, carboxyl, esterified carboxyl, acyl, acyloxy, amino, alkylsulphonyl and alkylthio radicals.

(c) Acyl residues of organic carboxylic and sulphonic acids: These include acyl radicals derived from (1) aliphatic carboxylic acids, for example the alkanoic acids (e.g., acetyl, propionyl), the phenylalkanoic acids (e.g., phenylacetyl), the phenoxyalkanoic acids (e.g., phenoxyacetic, phenoxypropionic), the phenyl- and phenoxyalkanoic acids containing one or more substituents in the aromatic nucleus (e.g., 2,4-dichlorophenoxyacetyl, alpha-(4 - chloro-2 - methylphenoxy)propionyl), (2) aromatic carboxylic acids, for example benzoic acid and benzoic acid containing one or more substituents in the aromatic nucleus (e.g., chlorobenzoyl, nitrobenzoyl, toluoyl), (3) aliphatic sulphonic acids (e.g., methanesulphonyl), and (4) aromatic sulphonic acids (e.g., benzenesulphonyl, toluenesulphonyl).

(d) With the proviso that $R_1$ cannot be hydrogen, any or all of the remaining radicals may be hydrogen.

(e) Esterified carboxyl or thiocarboxyl radicals: These include alkoxy- and aryloxycarbonyl (e.g., methoxycarbonyl, ethoxycarbonyl, phenoxycarbonyl), alkoxy- and aryloxythiocarbonyl (e.g., methoxythiocarbonyl, ethoxythiocarbonyl, phenoxythiocarbonyl) and alkylthio- and arylthiocarbonyl radicals (e.g., methylthiocarbonyl, ethylthiocarbonyl, phenylthiocarbonyl).

(f) Substituted and unsubstituted carbamoyl, thiocarbamoyl and sulphamoyl radicals: These include the radicals —$CONH_2$, —$CSNH_2$ and —$SO_2NH_2$, and the substituted radicals derived from these by replacement of one or both of the hydrogen atoms by organic radicals, such as for example alkyl radicals (e.g., methyl, ethyl, benzyl), aryl radicals (e.g., phenyl and substituted phenyl), cycloalkyl (e.g., cyclohexyl), and radicals which form with the nitrogen a heterocyclic ring (e.g., polymethylene, oxapolymethylene, such as pentamethylene, oxapentamethylene).

$R_6$:

This may be a simple alkylidene radical (e.g., ethylidene, propylidene) or may be an alkylidene radical containing one or more substituents such as for example aryl radicals (e.g. benzylidene), heterocyclic radicals (e.g., furfurylidene), and carboxyl radicals or derivatives thereof (e.g., 2-ethoxycarbonyl-1-methylidene).

$NR_4R_5$:

$R_4$ and $R_5$ may be joined so as to form, together with the nitrogen atom to which they are attached, a heterocyclic radical (e.g., radicals derived from substituted or unsubstituted piperidine, pyrrole, morpholine, piperazine).

$N(R_3)$—$NR_4R_5$:

$R_3$ and $R_4$ may be joined so as to form, with the nitrogen atoms to which they are attached, a heterocyclic radical (e.g. radicals derived from hydrogenated pyrazoles).

$N(R_3)$—$N=R_6$:

$R_3$ and $R_6$ may be joined so as to form, with the nitrogen atom to which they are attached, a heterocyclic radical (e.g., radicals derived from pyrazoles).

—$N(R_7)OR_8$:

$R_7$ and $R_8$ may be joined so as to form, with the nitrogen and oxygen atoms to which $R_7$ and $R_8$ respectively are attached, a heterocyclic radical (e.g., radicals derived from hydrogenated isoxazoles).

According to a further feature of the invention there is provided a process for preparing new herbicidal compounds of the general Formula I

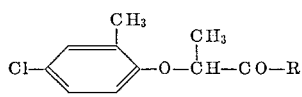   I wherein R is as hereinbefore defined, which comprises the steps (1) reacting a compound of the general Formula II

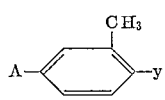   II with a compound of the general Formula III $$x-R°$$   III wherein $x$ and $y$ are atoms or atom groups which are jointly capable of forming the required $$-O-CH(CH_3)CO-$$

linkage, A is a hydrogen or chlorine atom, and R° is either the same as the group R which is desired in the final product or is readily transformable thereto, (2) when R° is not the same as the desired group R, transforming R° to R by known methods and (3) when A is a hydrogen atom, transforming A to a chlorine atom by known methods. Typical processes are illustrated below:

(a) Reaction of alpha - (4-chloro-2-methylphenoxy)-propionic acid or a reactive derivative thereof e.g., acid halide, ester, anhydride with a compound RH or a salt thereof.

(b) Reaction of 4-chloro-2-methylphenol or a salt thereof with a propionic acid derivative $CH_3CHZCOR$ wherein Z is a reactive group e.g., a halogen atom.

(c) Reaction of alpha - (4-chloro-2-methylphenoxy)-propionyl isocyanate or isothiocyanate with a compound RH.

(d) Reaction of alpha - (4-chloro-2-methylphenoxy)-propionic acid or a reactive derivative thereof e.g., acid halide, ester, anhydride, with a compound $$NH_3, HN(R_3)NR_4R_5, HN(R_3)-N=R_6 \text{ or } HN(R_7)OR_8$$

in which at least one of $R_3$, $R_4$, $R_5$, $R_7$ and $R_8$ is a hydrogen atom to obtain a compound $$ArCONH_2, ArCON(R_3)NR_4R_5, ArCON(R_3)=NR_6$$

or $$ArArCON(R_7)OR_8$$

(Ar=alpha-(4-chloro-2-methylphenoxy)ethyl)

and reacting this compound with a reactant capable of providing the desired substituent in place of said hydrogen atom or atoms. Examples include:

(1) Alkylation: e.g.

$$Ar\,CONH_2 \xrightarrow{\text{methylating agent}} Ar\,CONHCH_3$$

(2) Acylation: e.g.

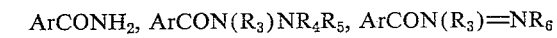

(3) Condensation with an ester of a halogeno-formic or thioformic acid: e.g.

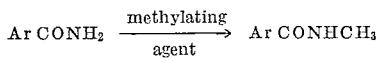

(4) Condensation with a carbonyl compound, followed by reduction if desired: e.g.

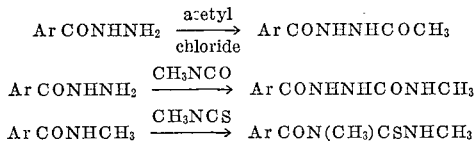

(e) Reaction of 4-chloro-2-methylphenol or a salt thereof with a propionic acid derivative $CH_3CHZCONH_2$, $CH_3CHZCON(R_3)NR_4R_5$, $CH_3CHZCON(R_3)N=R_6$ or $CH_3CHZCON(R_7)OR_8$ in which at least one of $R_3$, $R_4$, $R_5$, $R_7$ and $R_8$ is a hydrogen atom and reacting the product as exemplified in (d) above.

(f) Reaction of alpha-(2-methylphenoxy)propionic acid or a reactive derivative thereof, e.g., acid halide, ester, anhydride with a compound RH or a salt thereof, and chlorination of the product.

The compounds of the invention have been found to possess valuable herbicidal properties, and may be used to control selectively weeds in growing crops. Typical weeds include for example cleavers (*Galium aparine*), chickweed (*Stellaria media*), redshank (*Polygonum persicaria*), mayweed (*Tripleurospermum maritium* ssp. *inodorum*, *Anthemis cotula* and *Matricaria recutita*) and fat hen (*Chenopodium album*), which may be controlled selectively in such crops as cereals, rice, peas, flax, beans and maize.

Variation of the radical R has been found to produce compounds of varying herbicidal activities and varying selectivity characteristics, and for this reason all the compounds of general Formula I cannot be considered to be of equivalent value for all purposes. The choice of radical R will depend on the particular weed control problem under consideration.

In order to make use of the herbicidal properties of the compounds of the invention, they are preferably formulated. Accordingly a further feature of the invention is the provision of herbicidal compositions which comprise a compound of the general Formula I hereinbefore described in association with a conventional herbicide adjuvant. The term "conventional herbicide adjuvant" used in this specification is to be interpreted as meaning any diluent or carrier which may be used for the formulation of herbicidal compounds. Typical adjuvants include dispersing agents, emulsifying agents, wetting agents and pulverulent solid diluents. The compositions of the invention include not only compositions in a suitable form for application but also concentrated compositions which may be supplied to the user and which require dilution with a suitable quantity of water or other diluent before application.

Typical compositions falling within the invention include the following:

(a) *Dispersible solutions.*—A dispersible solution comprises a solid, active ingredient of low water solubility dissolved in a water-miscible solvent, with the addition of a dispersing agent, such that an aqueous dispersion is formed on dilution with water.

(b) *Dispersible powders.*—A dispersible powder comprises a solid active ingredient of low solubility in association with a dispersing agent, and a solid inert diluent if desired, for example kaolin.

(c) *Miscible oils.*—A miscible oil comprises an active ingredient of low water solubility dissolved in a water-immiscible solvent with the addition of an emulsifying agent such that an emulsion is formed on dilution with water. Alternatively the user may be supplied with a concentrated emulsion obtained from a miscible oil by the addition of approximately an equal volume of water. Such concentrated emulsions are diluted with an appropriate amount of water before application.

(d) *Concentrated suspension.*—A concentrated suspension comprises a solid, active ingredient of low water solubility milled to a paste with water and a dispersing agent.

(e) *Dusts.*—A dust comprises an active ingredient in association with a solid, pulverulent diluent which may be an inert diluent such as kaolin or a standard agricultural fertiliser.

(f) *Granular solids.*—These comprise an active ingredient associated with similar solid diluents to those which may be employed in the dust compositions, but the mixture is granulated by methods well-known in the art.

The dispersible solutions, dispersible powders, miscible oils and concentrated suspensions may also contain a wetting agent if desired.

The compositions may contain, in addition to the ingredients already mentioned, other conventional additives known in the art of herbicide formulations. Thus for example, compositions intended for application as sprays may contain an anti-foam agent e.g., liquid paraffin or a silicone fluid.

The compositions may also include one or more additional herbicides.

According to a further feature of the invention there is provided a method for eradicating weeds which comprises applying to the weeds or to the soil containing them a phytotoxic amount of a compound of general Formula I. In one embodiment of this feature there is provided a method for eradicating weeds from a crop area containing a growing crop which comprises applying to the crop area a compound of general Formula I at a dosage rate exerting a phytotoxic action against the weeds but substantially non-phytotoxic to the crop. The compounds are preferably applied prior to the emergence of the weeds. Application may be on the surface of the soil only, for example by spraying, or by incorporation in the top few inches of soil, for example by spraying followed by discing or harrowing. In most cases application will be carried out prior to emergence of both weeds and crop, but occasions will arise when treatment is carried out prior to emergence of the weeds but after the emergence of the crop. Some of the compounds may also find use in controlling weeds by application after emergence thereof.

The concentration of active ingredient in the compositions of the invention which are applied for weed control is dependent on the particular composition and the type of machine which is to be used. For example in the case of liquid compositions which are applied as sprays, low- and high-volume sprayers are commonly used to deliver liquid at rates from about 5 to 100 gallons per acre (about ½ to 10 hectolitres per hectare), and these require compositions containing different concentrations of active ingredient. From the point of view of weed control the important consideration is the total quantity of active ingredient applied per unit area of the soil. This dosage will vary from one compound of the invention to another and also according to the crop and the weeds to be controlled. However in general, rates of about ¼ to 50 pounds per acre (about ¼ to 50 kilograms per hectare) will normally be found to be effective, with rates of ½ to 5 pounds per acre (½ to 5 kilograms per hectare) being satisfactory in the majority of cases.

The following non-limitative examples illustrate the invention.

EXAMPLE 1

Alpha-(4 - chloro-2-methylphenoxy)propionyl chloride (20.5 gm.) in ether (100 ml.) was added dropwise with stirring to a solution of aniline (16.0 ml.) in ether (500 ml.). The resulting mixture was washed with dilute hydrochloric acid and water, dried and evaporated. The resulting solid was recrystallised from alcohol to give alpha-(4-chloro-2-methylphenoxy) propionanilide, M.P. 141–142°. (Found: N, 5.0. $C_{16}H_{16}ClNO_2$ requires N, 4.8%.)

EXAMPLE 2

Alpha-(4 - chloro - 2 - methylphenoxy)propionic acid (214.5 gm.), aniline (93 gm.) and xylene (1 litre) were boiled under reflux and the water which was formed was collected in a Dean and Stark apparatus. Separation of water ceased after 18 hours and most of the solvent was removed in vacuo on the steam bath. The residual solid was recrystallised from industrial methylated spirits to give alpha-(4-chloro - 2 - methylphenoxy)-propionanilide identical to that described in Example 1.

EXAMPLE 3

Alpha-(4 - chloro-2-methylphenoxy)propionyl chloride (23.3 gm.) was added dropwise with stirring to a mixture of o-chloroaniline (12.75 gm.), sodium carbonate (12.6 gm.), water (100 ml.), ice (100 gm.), and benzene (200 ml.). The benzene layer was separated and evaporated, to give a solid which on recrystallisation from alcohol gave alpha-(4-chloro-2-methylphenoxy)-propion-2-chloroanilide, M.P. 116–117° C.

EXAMPLE 4

Alpha-(4 - chloro-2-methylphenoxy)propionyl chloride (12.4 gm.) was added dropwise at 15–20° C. to a stirred mixture of m-chloroaniline (6.4 gm.) in dry benzene (100 ml.) containing triethylamine (5 gm.). After stirring for one hour, water was added and the product collected. Recrystallisation from methanol gave alpha-(4-chloro-2-methylphenoxy)propion-3-chloroanilide, M.P. 140–141° C.

By the methods described in Examples 1–4, the following compounds were obtained:

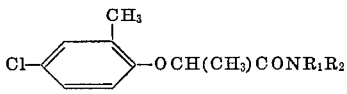

| R₂ | R₁ | M.P. or B.P. (° C.) |
|---|---|---|
| H | Methyl | 122–123 |
| H | Ethyl | 102–104 |
| H | n-Propyl | 98 |
| H | n-Butyl | 103–104 |
| H | n-Heptyl | 88–89.5 |
| H | n-Dodecyl | 76–77 |
| H | Allyl | 99–100 |
| H | Benzyl | 108–109 |
| H | o-Chlorobenzyl | 104–105 |
| H | p-Chlorobenzyl | 106–108 |
| H | β-Phenethyl | 104–105 |
| H | 2-hydroxyethyl | 87–89 |
| H | 2-hydroxypropyl | 73–75 |
| H | 3-hydroxypropyl | 82–83.5 |
| H | 2-hydroxy-1,1-dimethylethyl | 102–104 |
| H | 1-(hydroxymethyl)propyl | 95–97 |
| H | 2-ethoxyethyl | 92–94 |
| H | 2-methoxy-1-methylethyl | 105.5–106.5 |
| H | 3-methoxypropyl | 77–78 |
| H | 2-diethylaminoethyl | 67–68 |
| H | 2-piperidinoethyl | 84–85 |
| H | Carboxymethyl | 127.5–129 |
| H | 1-carboxyethyl | 126–127 |
| H | 1-carboxy-3-methylbutyl | 122–126 |
| H | 1-carboxy-2-phenylethyl | 158–161 |
| H | Ethoxycarbonylmethyl | 125–126.5 |
| H | $CH_2CH_2SO_3H$ | 169–174 |
| H | Cyanomethyl | 100.5–102 |
| H | Phenacyl | 113.5–114.5 |
| H | p-Methoxyphenacyl | 111.5–113 |
| H | p-Chlorophenyl | 150 |
| H | o-Bromophenyl | 113–114 |
| H | p-Fluorophenyl | 122–123 |
| H | o-Nitrophenyl | 80–81 |
| H | m-Nitrophenyl | 141–143 |
| H | p-Nitrophenyl | 138–139 |
| H | o-Tolyl | 164 |
| H | m-Tolyl | 134.5–135.5 |
| H | p-Tolyl | 151 |
| H | o-Methoxyphenyl | 109–110 |
| H | m-Methoxyphenyl | 104.5–105.5 |
| H | o-Ethoxyphenyl | 69–70 |
| H | m-Ethoxyphenyl | 118–119 |
| H | m-Trifluoromethylphenyl | 112.5–113.5 |
| H | p-Cyanophenyl | 110–112 |
| H | o-Carboxyphenyl | 139–141 |
| H | m-Carboxyphenyl | 204–205 |
| H | p-Carboxyphenyl | 207–210 |
| H | p-Ethoxycarbonylphenyl | 116–117 |
| H | p-Phenoxycarbonylphenyl | 145–147 |
| H | p-Carboxymethylphenyl | 188–190 |
| H | p-Acetylphenyl | 137–138.5 |
| H | p-Propionylphenyl | 139–140 |
| H | p-Benzoylphenyl | 97–99 |
| H | p-Acetylaminophenyl | 205–207 |
| H | m-Acetylphenyl | 108–108.5 |
| H | p-Alpha-(4-chloro-2-methylphenoxy)propionylphenyl | 210–212 |
| H | α-Naphthyl | 181–181.5 |
| H | p-Methylsulphonylphenyl | 134–135.5 |
| H | p-Toluenesulphonyl | 128.5–130 |

EXAMPLE 5

A mixture of alpha-(4-chloro-2-methylphenoxy)propion-m-acetylanilide (16.6 gm.), hydroxylamine hydrochloride (3.5 gm), anhydrous sodium acetate (4.1 gm.)

were refluxed in ethanol (200 ml.) for 3 hours. Addition of water gave a crystalline solid, which was recrystallised from toluene to give the oxime of alpha-(4-chloro-2-methylphenoxy)propion - m - acetylainilide, M.P. 158–160° C.

Similarly there were prepared the phenylhydrazone, M.P. 144–149° C. (decomp.), and the semicarbazone, M.P. 174–176° C.

EXAMPLE 6

Alpha-(4-chloro - 2 - methylphenoxy)proprionamide (5.4 gm.) and phenyl isocyanate (3 ml.) were heated in toluene (50 ml.) for 20 hours at 90° C. Addition of light petroleum and chilling gave N-2-(4-chloro-2-methylphenoxy)propionyl-N'-phenylurea, M.P. 98–99° C.

EXAMPLE 7

Alpha-(4-chloro-2-methylphenoxy)propionyl chloride (9.4 ml.) was added to a solution of ammonium thiocyanate (2.5 gm.) in acetone (150 ml.). The mixture was refluxed for 5 minutes and, after cooling, aniline (4.5 ml.) was added and the reaction mixture poured into water to give N-2-(4-chloro-2-methylphenoxy)propionyl-N'-phenylthiourea, M.P. 123–124.5 (ex methanol).

EXAMPLE 8

Ethyl alpha-(4- - chloro - 2 - methylphenoxy)propionate (15 gm.) and hydrazine hydrate (10 ml.) were refluxed in ethanol (100 ml.) for 1 hour. Addition of water gave alpha - (4 - chloro - 2 - methylphenoxy)propionhydrazide, M.P. 142.5–143.5 (ex methanol).

Using hydroxylamine in place of hydrazine, there was obtained alpha-(4-chloro-2-methylphenoxy)propionohydroxamic acid, M.P. 124–125° C. (isolated via the copper complex).

EXAMPLE 9

Alpha - (4 - chloro - 2 - methylphenoxy)propionyl chloride (9.4 ml.) was added to a mixture of phenylhydrazine (5.7 gm.), toluene (100 ml.) and pyridine (4 ml.) and heated at 95° C. for 2 hours. Addition of water and filtration gave N-alpha-(4-chloro-2-methylphenoxy)propion-N'-phenylhydrazide, M.P. 159–161° C. (ex ethanol).

By a similar method, there were prepared the following:

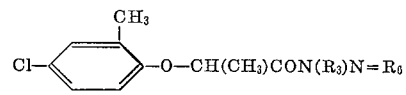

| $R_3$ | $R_4$ | $R_5$ | M.P. or B.P. (° C.) |
|---|---|---|---|
| H | H | o-Chlorophenyl | 170–171 |
| H | H | o-Tolyl | 158 |
| H | H | p-Nitrophenyl | 200–202 |
| H | Methyl | Methyl | 154–155 |
| Phenyl | H | Phenyl | 163–165 (decomp.) |
| H | Pentamethylene | | 165–167 (decomp.) |

EXAMPLE 10

Acetyl chloride (3.9 gm.) was added to a mixture of alpha - (4 - chloro - 2 - methlphenoxy)propionhydrazide (11.4 gm.), benzene (100 ml.) and pyridine (3.9 gm.) and refluxed for 30 minutes. Addition of water and filtration gave N'-acetyl-N-alpha-(4-chloro-2-methylphenoxy)-propionhydrazide, M.P. 184–186° C. (decomp. ex aqueous ethanol).

By a similar method alpha-(4-chloro-2-methylphenoxy)-propionhydrazide was reacted with other acylating agents to give the following compounds:

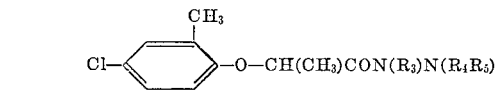

| Acylating agent | $R_3$ | $R_4$ | $R_5$ | M.P. or B.P. (° C.) |
|---|---|---|---|---|
| Formic acid | H | H | Formyl | 171–173 |
| Alpha-(4-chloro-2-methyl-phenoxy)-propionyl chloride. | H | H | Alpha-(4-chloro-2-methylphenoxy)-propionyl. | [1] 247 |
| Benzoyl chloride | H | H | Benzoyl | 173–174 |
| Benzenesulphonyl chloride. | H | H | Benzenesulphonyl | [2] 136–138 |
| Methyl isocyanate | H | H | Methylcarbamoyl | 181–182 |
| Ethyl isocyanate | H | H | Ethylcarbamoyl | 184–185 |
| Butyl isocyanate | H | H | Butylcarbamoyl | 176 |
| p-Methoxyphenyl isocyanate. | H | H | p-Methoxyphenyl-carbamoyl. | 204–205 |
| Cyclohexyl isocyanate | H | H | Cyclohexylcarbamoyl | 212–213 |
| Methyl isothiocyanate | H | H | Methylthiocarbamoyl | 175–176 |
| Ethyl isothiocyanate | H | H | Ethylthiocarbamoyl | 172–174 |
| Phenyl isothiocyanate | H | H | Phenylthiocarbamoyl | 156–158 |
| p-Pentylsulphonyl-phenyl isothiocyanate. | H | H | p-Pentylsulphonyl-phenylthiocarbamoyl. | 152–153 |
| Methyl chloroformate | H | H | Methoxycarbonyl | 132–133 |
| Ethyl chloroformate | H | H | Ethoxycarbonyl | [2] 95–96 |
| Isopropyl chloroformate | H | H | Isopropoxycarbonyl | [2] 96–98 |

[1] Sinters 230–232.  [2] Decomp.

EXAMPLE 11

Alpha - (4 - chloro-2-methylphenoxy)propionhydrazide (17.1 gm.), alcohol (250 ml.) and acetaldehyde (12.75 ml.) were refluxed for 30 minutes. Cooling gave N-alpha-(4 - chloro - 2 - methylphenoxy)propion-N'-ethylidenehydrazide, M.P. 162° C. (ex ethanol).

By similar methods there were prepared the following:

| $R_3$ | $R_6$ | M.P. or B.P. (° C.) |
|---|---|---|
| H | Benzylidene | 184–185 |
| H | Isopropylidene | 174.5–175.5 |
| H | 1-phenylethylidene | 194–196 |
| H | 2-furfurylidene | 180–182 (decomp.) |
| H | 2-ethoxycarbonyl-1-methyl-ethylidene. | 134–135 (decomp.) |
| | $CH_3-C\overset{N-}{\underset{\diagdown CH}{\diagup}}\overset{N}{\underset{\diagdown CH_3}{\overset{\|}{C}}}$ | 99–101 (decomp.) |

By hydrogenation of the appropriate alkylidene compound there were prepared N-alpha-(4-chloro-2-methylphenoxy)propion-N'-ethylhydrazine, M.P. 134–136° C. and the corresponding N'-isopropylhydrazide, M.P. 133–134° C.

EXAMPLE 12

Alpha - (4 - chloro - 2-methylphenoxy)propionohydroxamic acid (11.5 gm.), anhydrous potassium carbonate (10 gm.), iodomethane (10 gm.), methanol (150 ml.) and water (50 ml.) were refluxed for 24 hours. The methanol was removed, the reaction mixture diluted with water and acidified giving alpha-(4-chloro-2-methylphenoxy)propion-O-methylhydroxamic acid, M.P. 124–125° C.

Similarly there was prepared the corresponding O-ethylhydroxamic acid, M.P. 101–102° C.

EXAMPLE 13

By the method of Example 11, using alpha-(4-chloro-2-methylphenoxy)propionohydroxamic acid in place of alpha - (4-chloro-2-methylphenoxy)propionhydrazide, there were prepared O-benzoyl-alpha-(4-chloro-2-methylphenoxy)propionohydroxamic acid, M.P. 145–146° C., and the O-acetyl analogue, M.P. 105–107° C.

EXAMPLE 14

In the preparation of a dispersible powder, the following ingredients were ground together (parts by weight):

(a)

| | Percent |
|---|---|
| Alpha-(4-chloro-2-methylphenoxy)propion-o-chloroanilide | 50 |
| Ethylan C.P., a proprietary wetting agent which is a polyethylene oxide condensate of octylphenol | 2.5 |
| Sulphite lye | 10 |
| Kaolin | to 100 |

(b)

| | |
|---|---|
| Alpha - (4-chloro-2-methylphenoxy)propionhydrazide | 25 |
| Ethylan C.P. | 2.5 |
| Sulphite lye | 10 |
| Colloidal silicic acid | 10 |
| Kaolin | to 100 |

(c)

| | |
|---|---|
| Alpha - (4-chloro-2-methylphenoxy)propion-N-3'-hydroxypropylamide | 25 |
| Pluronic F. 68, a proprietary wetting agent which is a condensate of ethylene oxide, propylene oxide and propylene glycol | 5 |
| Sulphite lye | 10 |
| Colloidal silicic acid | 10 |
| Kaolin | to 100 |

(d)

| | |
|---|---|
| Alpha - (4 - chloro - 2-methylphenoxy)propionanilide | 50 |
| Ethylan C.P. | 2 |
| Sulphite lye | 10 |
| Colloidal silicic acid | 5 |
| Kaolin | to 100 |

EXAMPLE 15

A miscible oil was prepared by mixing the following ingredients (parts by weight):

| | Parts |
|---|---|
| Alpha - (4-chloro-2-methylphenoxy)propion-o-chloroanilide | 5 |
| Arylan C.A., a proprietary emulsifying agent which is calcium dodecylbenzene sulphonate | 2 |
| Ethylan B.V., a proprietary emulsifying agent which is an octylphenyl polyethylene oxide condensate | 2 |
| Toluene | 91 |

EXAMPLE 16

A dust was prepared by grinding together alpha-(4-chloro-2-methylphenoxy)propionanilide (10 parts by weight) and kaolin (90 parts by weight).

EXAMPLE 17

The selective herbicidal properties of the compounds are illustrated by the results shown below, which also show the varying herbicidal activities and selectivity characteristics obtained by varying the radical R in general Formula I. The results were obtained by seeding the crops and weeds in trays in the greenhouse and spraying the soil immediately with a range of logarithmically related application rates of the chemicals under test, from ½ lb./acre to 32 lb./acre. The effect of the treatments were recorded using a scoring system as follows:

0.—No control at all application rates.
1.—Control down to 16 lb. per acre.
2.—Control down to 8 lb. per acre.
3.—Control down to 4 lb. per acre.
4.—Control down to 2 lb. per acre.
5.—Control down to 1 lb. per acre.
6.—Control down to ½ lb. per acre.

| Compound R | Red Shank | Oats | Kale | Grass | Chickweed | Marigold | Fat Hen |
|---|---|---|---|---|---|---|---|
| 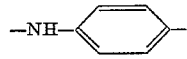 —NH—⟨⟩—NO₂ | 6 | 5 | 6 | 0 | 6 | 6 | 6 |
| —NHCH₂CH₂CH₃ | 2 | 0 | 6 | 0 | 6 | 2 | 3 |
| 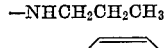 —NH—⟨⟩—F | 6 | 0 | 6 | 0 | 6 | 6 | ------- |
| —NHCH₂CH₂OH | ------- | 3 | 5 | 2 | 6 | 6 | 6 |
| 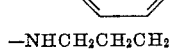 —NH—⟨⟩—benzoyl | 6 | 1 | 6 | 1 | 6 | 6 | 6 |
| 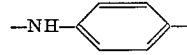 —NH—⟨⟩ | 6 | 0 | 6 | 0 | 6 | 6 | 6 |

We claim:
1. Alpha-(4-chloro-2-methylphenoxy)propionanilide.
2. Alpha-(4-chloro-2-methylphenoxy)propion-3'-acetylanilide.
3. Alpha - (4-chloro-2-methylphenoxy)propioncarboxylanilide.
4. Alpha - (4 - chloro - 2 - methylphenoxy)propionphenoxycarbonylanilide.

References Cited

UNITED STATES PATENTS

| | | | |
|---|---|---|---|
| 2,479,295 | 8/1949 | Behrens et al. | 260—559 |
| 3,133,119 | 5/1964 | Nikawitz | 260—559 |

FOREIGN PATENTS 823,208  11/1959  Great Britain.

OTHER REFERENCES

Julia et al., Bul. Soc. Chim., France, vol. 23, pp. 776–83, 1965.

Matolcsy et al., Weed Res., vol. 4, pp. 118–22, June 1964.

Thompson et al., Botanical Gaz., vol. 107, pp. 476–503 relied on (1946).

Thuillier et al., I Bul. Soc. Chim., France, 1960, pp. 1786–94.

Thuillier et al., II, Comptes Rendus Acad. Sciences, vol. 250, pp. 1674–76 (1960).

JOHN D. RANDOLPH, *Primary Examiner.*

NATALIE TROUSOF, *Assistant Examiner.*

U.S. Cl. X.R.

71—92, 94, 95, 99, 100, 103, 105, 108, 111, 118, 119, 120; 260—239, 240, 247.2, 247.7, 268, 294, 294.7, 307, 310, 326.5, 438.1, 453, 454, 455, 465, 473, 500.5, 507, 516, 519, 521, 544, 546, 552, 553, 554, 556, 558, 559